United States Patent [19]

Myles

[11] Patent Number: 5,443,087

[45] Date of Patent: Aug. 22, 1995

[54] METHOD AND SYSTEM FOR CONTROLLING A PRESSURIZED FLUID AND VALVE ASSEMBLY FOR USE THEREIN

[75] Inventor: Colin K. Myles, Waterford, Mich.

[73] Assignee: Melea Limited, Southfield, Mich.

[21] Appl. No.: 166,255

[22] Filed: Dec. 13, 1993

[51] Int. Cl.⁶ .............................................. G05B 11/50
[52] U.S. Cl. ...................................... 137/14; 137/102; 137/596.15; 137/596.16
[58] Field of Search ............... 91/433; 137/102, 596.15, 137/596.16, 14, 487.5

[56] References Cited

U.S. PATENT DOCUMENTS

| | | | |
|---|---|---|---|
| 4,117,706 | 10/1978 | Lami | 137/102 |
| 4,241,750 | 12/1980 | Furuse et al. | 137/102 X |
| 4,555,766 | 11/1985 | Wright | 137/85 X |
| 4,961,441 | 10/1990 | Salter | 137/14 |
| 5,020,564 | 6/1991 | Thoman et al. | 137/102 |
| 5,114,660 | 5/1992 | Hendry | |
| 5,142,483 | 8/1992 | Basham et al. | |
| 5,257,640 | 11/1993 | Delajoud | 137/14 |

Primary Examiner—Gerald A. Michalsky
Attorney, Agent, or Firm—Brooks & Kushman

[57] ABSTRACT

A method and system are provided for controlling a pressurized fluid such as nitrogen gas which may be initially stored at a pressure as high as 20,000 psi. The pressurized nitrogen gas may be utilized in high pressure gas systems such as in gas-assisted injection molding systems or low pressure gas systems such as robotic control and actuators. A valve assembly is utilized in the method and system and includes an electric proportioning device such as a pneumatic servovalve and a pair of pneumatic, fluidly-coupled valves which are piloted by the servovalve to regulate the pressure of the pressurized nitrogen gas. In the method and system, the servovalve operates in a closed loop fashion by utilizing feedback from a feedback device such as a pressure transducer. A controller in the closed loop is responsive to a pressure signal from the pressure transducer and a preset reference signal to provide an error control signal to the servovalve.

18 Claims, 2 Drawing Sheets

METHOD AND SYSTEM FOR CONTROLLING A PRESSURIZED FLUID AND VALVE ASSEMBLY FOR USE THEREIN

TECHNICAL FIELD

This invention relates to methods and systems for controlling pressurized fluids and valve assemblies for use therein and, in particular, to closed loop methods and systems for controlling high or low pressure fluids and valve assemblies for use therein.

BACKGROUND ART

U.S. Pat. No. 5,114,660 discloses a method and system for the injection molding of plastic articles in an injection molding system including a pneumatically-operated gas compression unit having a high pressure gas receiver. A fluid pressure reducing valve, together with a directional control valve, controlled by a controller reduces the pressure of the high pressure nitrogen gas and communicates the pressurized fluid from the gas receiver to the injection molding system.

Briefly, gas-assisted injection molding is a thermoplastic molding process which provides stress-free large parts with a class A surface and virtually no sink marks. Gas-assisted injection molding is a low pressure molding process compared to conventional injection molding. In this process, inert gas such as nitrogen is injected into the plastic after it enters a mold. By controlling the gas pressure, the quantity of plastic injected into the mold (short shot) and the rate of gas flow, a predetermined network of hollow interconnected channels is formed within the molded part. The gas pressure remains constant in the network of hollow channels during the molding. This compensates for the tendency of the plastic to shrink at the thicker areas of the molding preventing warpage and reducing stress. The gas pressure is relieved just prior to opening the mold. Because of the relatively low injection pressure, large parts can be molded with substantial reductions in clamp tonnage.

Consequently, gas supply equipment must provide precise control of pressure, timing and volume of gas which is injected into the part, all of which are important to the control of the gas-assisted injection process.

In general, prior art valve assemblies exhibit relatively slow response and have a considerable amount of on-board electronics and take up a considerable amount of room, especially when multiple valve assemblies are required to service a number of injection molds or parts of molds.

SUMMARY OF THE INVENTION

An object of the present invention is to provide a method and system for controlling a pressurized fluid and a valve assembly for use therein wherein the resulting regulated pressurized fluid can be used in high or low pressure, fast response applications.

Another object of the present invention is to provide a method and system for controlling a pressurized fluid and valve assembly for use therein wherein the valve assembly has a relatively small amount of on-board electronics, is relatively inexpensive, and also provides a compact structure to allow for multiple valve assemblies in a relatively small space.

In carrying out the above objects and other objects of the present invention, a method is provided for controlling a pressurized fluid having a first pressure to provide the pressurized fluid at a regulated, desired pressure less than the first pressure. The method includes the step of providing a pair of pneumatically-operated, fluidly-coupled valves, and an electric proportioning device for operating the valves. The pressurized fluid is communicated to the valves. The method also includes the steps of generating a reference signal representative of the desired pressure, generating a reference control signal based on the reference signal and coupling the reference control signal to the proportioning device to control the pressure of the pressurized fluid regulated by the valves. The method also includes the steps of generating a feedback signal as a function of the actual pressure of the regulated pressurized fluid and generating an error signal based on the difference between the reference signal and the feedback signal. The error signal is representative of a desired amount of fluid pressure change. The method finally includes the step of generating an error control signal as a function of the error signal to control the proportioning device. The proportioning device, in turn, operates the valves to provide the pressurized fluid at the regulated desired pressure.

Further in carrying out the above objects and other objects of the present invention, a system is provided for carrying out each of the above method steps.

Also provided is a valve assembly for controlling a pressurized fluid having a first pressure to provide the pressurized fluid at a regulated desired pressure less than the first pressure. The valve assembly includes a first valve having an input port adapted to receive the high pressure fluid, an outlet port, and a control port adapted to receive a first pneumatic control signal to selectively open and close the input port. The assembly also includes a second valve having an input port, an output port, and a control port adapted to receive a second pneumatic control signal to selectively open and close the output port of the second valve to exhaust the pressurized fluid. A mechanism for fluidly communicating the outlet port of the first valve to the inlet port of the second valve is also provided. The mechanism also includes an output port for communicating the regulated pressurized fluid. Finally, the valve assembly includes an electric proportioning device for providing the first and second pneumatic control signals to control the first and second valves, respectively, based on the electrical control signal so that regulated pressurized fluid at the desired pressure is available at the output port of the mechanism.

Preferably, each of the valves is a pilot operated pneumatic valve and the proportioning device is a pneumatic servovalve for communicating a pneumatic control signal to each of the valves in response to the electrical control signal to control the opening and closing of the valves to, in turn, regulate the pressure of the pressurized fluid.

Also preferably, in one embodiment the pressurized fluid is a high pressure fluid such as nitrogen gas having a pressure in the range of 1,000-20,000 psi for use in a gas-assisted injection molding system. In another embodiment the pressurized fluid has a pressure capable of controlling robots and actuators.

The advantages according to the method, system and valve assembly of the present invention are numerous. For example, the method, system and valve assembly are capable of operating in high or low pressure, fast response pressure control applications. Furthermore, the valve assembly has fewer on-board electronics and exhibits considerable cost savings over competitive assemblies. Finally, the valve assembly is relatively compact and allows for the use of multiple valve assemblies in a relatively small space.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
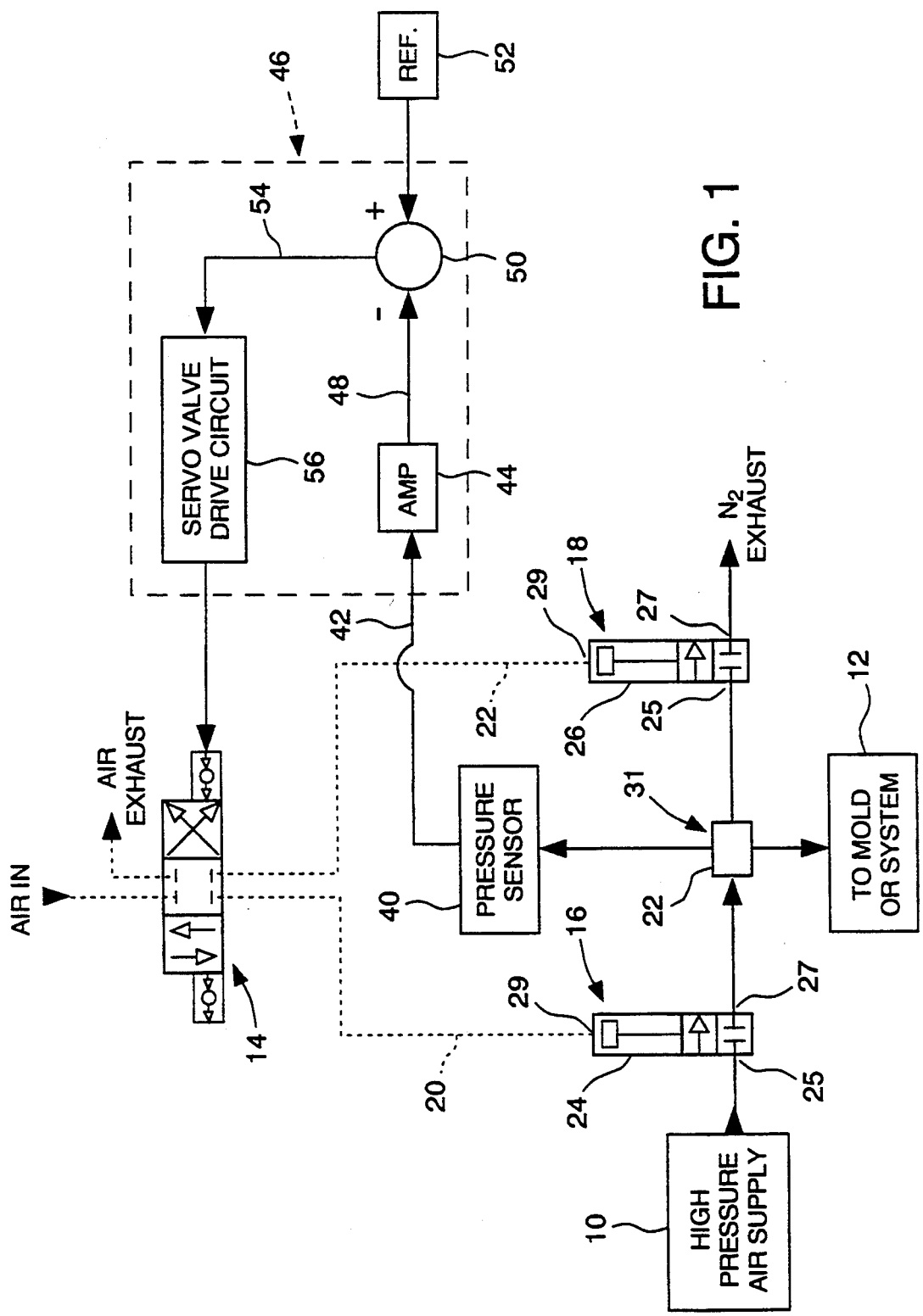
FIG. 1 is a schematic block diagram illustrating the method, system and valve assembly of the present invention.
Figure 2:
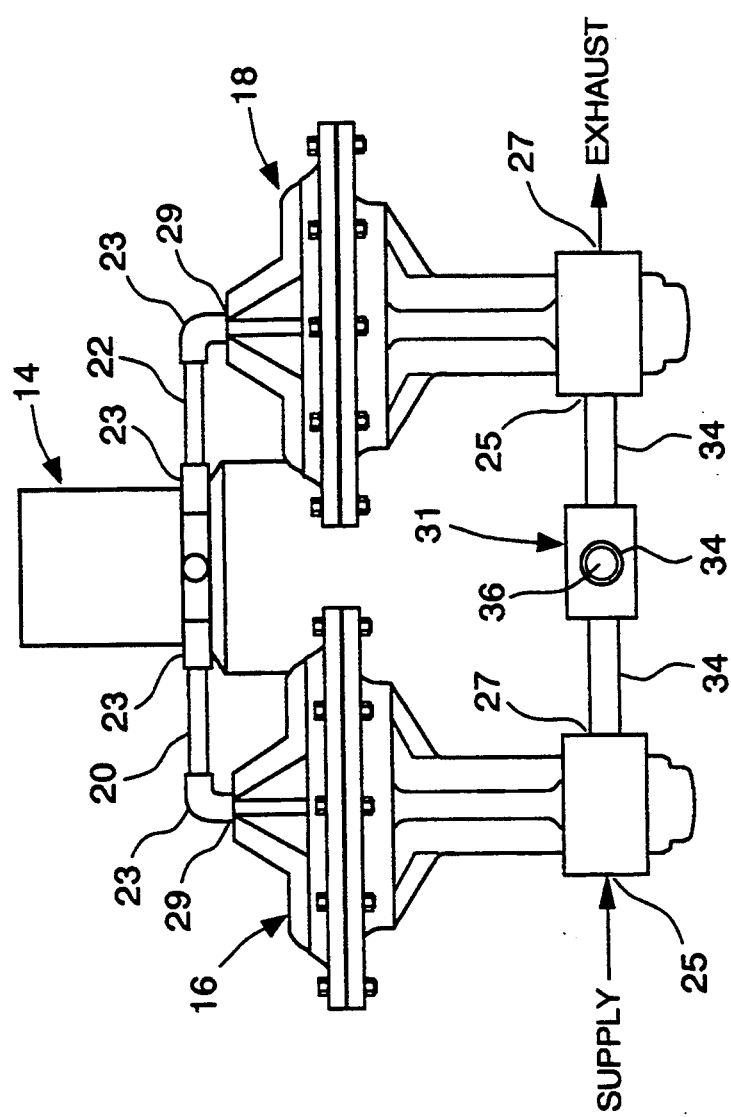
FIG. 2 is a schematic front elevational view of the valve assembly of the present invention.

Referring now to the drawing figures, there is illustrated in FIG. 1 in block diagram form, a method, system and valve assembly constructed with the present invention to control a high pressure fluid such as a nitrogen gas which is stored in a high pressure air supply or receiver 10. The high pressure nitrogen gas may be stored in a gas pressure receiver such as illustrated in U.S. Pat. No. 5,114,660 at a pressure of 1,000–20,000 psi. As described in U.S. Pat. No. 5,114,660, the gas is stored at high pressure to provide a ready source of high pressure gas for use in a gas-assisted injection mold or system, as illustrated at 12 in FIG. 1 and as described in U.S. Pat. No. 5,114,660. However, it is to be understood that the method, system and valve assembly can be used to supply low pressure (i.e. approximately 80 psi) fluid for use in robotic or actuator control. The method and system provide the pressurized gas at a regulated desired pressure less than the pressure at which the gas is stored as is described in greater detail hereinbelow.

In general, the valve assembly of the present invention includes an pneumatic servovalve, generally indicated at 14, or other air or gas operated proportional valve. The valve assembly also includes first and second pneumatically-operated, fluidly-coupled valves generally indicated at 16 and 18, respectively. The valves 16 and 18 are piloted or controlled along control lines 20 and 22, respectively, by the servovalve 14. Fittings 23 secure the lines 20 and 22 to the servovalve 14 and the valves 16 and 18.

Each of the pneumatic valves 16 and 18 includes an actuator section 24 and 26, respectively, which includes a diaphragm which responds to a pneumatic control signal on its respective control line. The control signals from the servovalve 14 control the opening and closing of the valves 16 and 18 to thereby regulate the pressure of the high pressure nitrogen gas.

Each of the pneumatic valves 16 and 18 also includes an inlet port 25, an outlet port 27 and a control port 29 for receiving control signals from the servovalve 14. The inlet port 25 of the first valve 16 opens or closes in response to the control signal received at its input port 29. In like fashion, the outlet port 27 of the second valve 18 opens or closes in response to the control signal received at its input port 29.

Preferably, the pneumatic servovalve is an Atchley air servo having Model No. 204PN500S/NO60. Also preferably, each of the pilot-operated pneumatic valves is a Dragon air-operated two-way valve having Model No. 85C053KV.

The two-way valves 16 and 18 are plumbed together by a means or assembly 31 for fluidly communicating the outlet port 27 of the pneumatic valve 16 with the inlet port 25 of the pneumatic valve 18. The assembly 31 is preferably an HIP cross assembly including a high pressure cross 32 and a number of adapters 34 to fluidly connect the cross 32 to the valves 16 and 18 and a pressure sensor 40. An adaptor 34 also fluidly connects an outlet port 36 of the cross 32 to the system 12.

While the pneumatic servovalve 14 is gas or air operated, it operates electronically in a closed loop system. A feedback mechanism such as the pressure sensor or transducer 40 is capable of generating a feedback signal as a function of the actual pressure of the regulated high pressure fluid at the cross assembly 31. The pressure sensor 40 supplies the signal along line 42. The fluid pressure signal is representative of the actual pressure of the regulated high pressure fluid. The fluid pressure signal is typically amplified by an amplifier 44 of a controller, generally indicated at 46. Then the amplified signal is set along a line 48 where it is subtracted from a reference signal at a junction block 50. Typically, the reference signal is output by a reference block 52 which may be a manual setting on the controller 46. The reference signal represents the desired pressure for the high pressure nitrogen gas to be utilized by the system 12.

The junction block 50, in turn, generates an error signal on a line 54 which is utilized by a servo-valve drive circuit 56 of the controller 46. The servovalve drive circuit 56 utilizes the error signal appearing on the line 54 to output to the pneumatic servovalve 14 an appropriate error control signal to drive the pneumatic servovalve 14.

Preferably, the controller 46 is located remotely from the valve assembly.

Briefly, the pneumatic servovalve 14 initially receives an electrical reference control signal from the controller 46 based on a value set by the reference block 52. In response to the electrical control signal, the pneumatic servovalve 14 allows a proportionate amount of pneumatic pressure into the actuator sections 24 and 26 of the valves 16 and 18, respectively. The two-way valves 16 and 18, in turn, open or close in order to either let high pressure in at the inlet port 25 of the valve 16 from the high pressure air supply 10 or let pressure out in a form of nitrogen gas exhausted at the outlet port of the valve 18. The actual pressure of the regulated high pressure gas which is sent to the system 12 is read by the pressure sensor 40 and fed back to the controller 46 to provide feedback control.

Then, the feedback signal is utilized with the reference signal to generate an error signal at the junction 50. The error signal is representative of a desired amount of fluid pressure change. The drive circuit 56 uses the error signal which drives the servovalve 14.

As previously mentioned, the method, system and valve assembly have numerous advantages. For example, control electronics are not located on-board the valve assembly. This has the benefit of allowing electronics to be mounted in a less hazardous environment for increased reliability. Furthermore, the valve assembly is more cost effective than existing valve assemblies. Finally, the compactness of the valve assembly allows for the mounting of multiple valve assembly in a confined space to service multiple gas-assisted injection molding systems.

While the best mode for carrying out the invention has been described in detail, those familiar with the art to which this invention relates will recognize various alternative designs and embodiments for practicing the invention as defined by the following claims.

What is claimed is:

1. A method for controlling a pressurized fluid having a first pressure to provide the pressurized fluid at a regulated desired pressure less than the first pressure, the method comprising the steps of:

providing a pair of pneumatically-operated, fluidly-coupled valves and an electric proportioning device for opening and closing the valves;

communicating the pressurized fluid to the valves;

generating a reference signal representative of the desired pressure;

generating a reference control signal based on the reference signal;

coupling the reference control signal to the proportioning device to control the pressure of the pressurized fluid regulated by the valves;

generating a feedback signal as a function of actual pressure of the regulated pressurized fluid;

generating an error signal based on the difference between the reference signal and the feedback signal, the error signal being representative of a desired amount of fluid pressure change; and generating an error control signal as a function of the error signal to control the proportioning device, the proportioning device, in turn, communicating a pneumatic control signal to each of the valves in response to the reference and error control signals to control the opening and closing of the valves to, in turn, regulate the pressure of the pressurized fluid.

2. The method of claim 1 wherein the step of generating the feedback signal includes the step of measuring the actual pressure of the regulated pressurized fluid with a pressure transducer to obtain a fluid pressure signal.

3. The method of claim 1 wherein each of the valves is a pilot-operated pneumatic valve.

4. The method of claim 3 wherein the proportioning device is a pneumatic servovalve.

5. The method of claim 1 wherein the pressurized fluid is nitrogen gas having a pressure in the range of 1,000–20,000 psi for use in a gas-assisted injection molding system.

6. The method of claim 1 wherein the pressurized fluid has a pressure capable of controlling robots and actuators.

7. A control system for controlling a pressurized fluid having a first pressure to provide the pressurized fluid at a regulated desired pressure less than the first pressure, the control system comprising:

· a pair of pneumatically-operated, fluidly-coupled valves;

an electric proportioning device coupled to the valves for opening and closing the valves as a function of control signals to control the pressure of the pressurized fluid regulated by the valves;

means for generating a reference signal representative of the desired pressure;

feedback means for generating a feedback signal as a function of actual pressure of the regulated pressurized fluid;

means for generating an error signal as a function of the difference between the reference signal and the feedback signal, the error signal being representative of a desired amount of pressurized fluid change; and a controller for initially generating a reference control signal based on the reference signal and then generating an error control signal as a function of the error signal to control the electric proportioning device, the proportioning device, in turn, communicating a pneumatic control signal to each of the valves in response to the control signals to control the opening and closing of the valves to, in turn, regulate the pressure of the pressurized fluid.

8. The control system of claim 7 wherein the feedback means includes a pressure transducer for measuring the actual pressure of the regulated pressurized fluid to obtain a fluid pressure signal.

9. The control system of claim 7 wherein each of the valves is a pilot-operated pneumatic valve.

10. The control system as claimed in claim 9 wherein the proportioning device is a pneumatic servovalve.

11. The control system as claimed in claim 7 wherein the pressurized fluid is nitrogen gas having a pressure in the range of 1,000–20,000 psi for use in a gas-assisted injection molding system.

12. The system of claim 7 wherein the pressurized fluid has a pressure capable of controlling robots and actuators.

13. A valve assembly for controlling a pressurized fluid having a first pressure to provide the pressurized fluid at a regulated desired pressure less than the first pressure, the valve assembly comprising:

a first valve having an input port adapted to receive the pressurized fluid, an outlet port, and a control port adapted to receive a first pneumatic control signal to selectively open and close the input port;

a second valve having an input port, an output port, and a control port adapted to receive a second pneumatic control signal to selectively open and close the output port of the second valve to exhaust the pressurized fluid;

means for fluidly communicating the outlet port of the first valve to the inlet port of the second valve, said means for fluidly communicating having an output port for communicating the regulated pressurized fluid; and an electric proportioning device for providing the first and second pneumatic control signals to control the opening and closing of the first and second valves, respectively, based on an electrical control signal so that regulated pressurized fluid at the desired pressure is available at the output port of the means for fluidly communicating.

14. The valve assembly as claimed in claim 13 wherein each of the valves is a pilot-operated pneumatic valve.

15. The valve assembly as claimed in claim 14 wherein the proportioning device is a pneumatic servovalve.

16. The valve assembly as claimed in claim 13 wherein the pressurized fluid is nitrogen gas having a pressure in the range of 1,000–20,000 psi for use in a gas-assisted injection molding system.

17. The valve assembly as claimed in claim 13 wherein the means for fluidly communicating includes a cross assembly.

18. The valve assembly as claimed in claim 13 wherein the pressurized fluid has a pressure capable of controlling robots and actuators.

* * * * *